(12) United States Patent
Kang et al.

(10) Patent No.: US 11,623,496 B2
(45) Date of Patent: Apr. 11, 2023

(54) AIR CONDITIONER FOR VEHICLE

(71) Applicant: Hanon Systems, Daejeon (KR)

(72) Inventors: In Keun Kang, Daejeon (KR); Jae Woo Ko, Daejeon (KR); Young Keun Kim, Daejeon (KR); Jong Min Lee, Daejeon (KR); Gyu Ik Han, Daejeon (KR)

(73) Assignee: Hanon Systems, Daejeon (KR)

( * ) Notice: Subject to any disclaimer, the term of this patent is extended or adjusted under 35 U.S.C. 154(b) by 823 days.

(21) Appl. No.: 16/293,863

(22) Filed: Mar. 6, 2019

(65) Prior Publication Data
US 2019/0315191 A1    Oct. 17, 2019

(30) Foreign Application Priority Data

Mar. 7, 2018  (KR) .................. 10-2018-0026726
Feb. 20, 2019  (KR) .................. 10-2019-0019992

(51) Int. Cl.
*B60H 1/00*      (2006.01)

(52) U.S. Cl.
CPC ............................. *B60H 1/00692* (2013.01)

(58) Field of Classification Search
CPC ............ B60H 1/00692; B60H 1/00857; B60H 1/00421; B60H 2001/007
USPC ............................................. 454/121
See application file for complete search history.

(56) References Cited

U.S. PATENT DOCUMENTS

| | | | |
|---|---|---|---|
| 2007/0184774 A1* | 8/2007 | Balzo ............ | B60H 1/00857 454/143 |
| 2009/0305623 A1* | 12/2009 | Lange ............ | B60H 1/00671 454/121 |
| 2011/0072925 A1 | 3/2011 | Ikeda | |
| 2013/0008203 A1* | 1/2013 | Makita ........... | B60H 1/00857 62/515 |
| 2013/0008627 A1* | 1/2013 | Uemura ......... | B60H 1/00849 165/96 |
| 2015/0107815 A1* | 4/2015 | Hhraguchi ..... | B60H 1/00064 165/202 |
| 2017/0305230 A1* | 10/2017 | Sekito ............ | B60H 1/00057 |

FOREIGN PATENT DOCUMENTS

| | | |
|---|---|---|
| DE | 102016220124 A1 | 4/2017 |
| DE | 112015004534 T5 | 7/2017 |
| JP | 2010253973 A | 11/2010 |
| JP | 2015110404 A | 6/2015 |

* cited by examiner

*Primary Examiner* — Avinash A Savani
*Assistant Examiner* — Dana K Tighe
(74) *Attorney, Agent, or Firm* — Norton Rose Fulbright US LLP; James R. Crawford

(57) ABSTRACT

The present invention relates to an air conditioner for a vehicle having a cover of an improved structure which can prevent foreign matters from being introduced into a sliding door driving part and also prevent the introduced foreign matters from being stuck in the driving part. The air conditioner for a vehicle, which includes an air-conditioning case having a heat exchanger, and a first door and a second door disposed in the air-conditioning case to adjust the degree of opening of an air passageway, further includes: a plurality of driving parts for interlocking and operating the first door and the second door; and a cover part for fixing the driving part to the air-conditioning case. The cover part covers at least one among the plurality of driving parts.

17 Claims, 14 Drawing Sheets

PRIOR ART

AIR CONDITIONER FOR VEHICLE

This application claims priority from Korean Patent Application Nos. 10-2018-0026726 filed on Mar. 7, 2018 and 10-2019-0019992 filed on Feb. 20, 2019. The entire contents of these applications are incorporated herein by reference in their entirety.

BACKGROUND OF THE INVENTION

Field of the Invention

The present invention relates to an air conditioner for a vehicle, and more particularly, to an air conditioner for a vehicle having a cover of an improved structure which can prevent foreign matters from being introduced into a sliding door driving part and also prevent the introduced foreign matters from being stuck in the driving part.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 is a sectional view showing a conventional air conditioner for a vehicle. As shown in FIG. 1, the conventional air conditioner 1 for a vehicle includes an air-conditioning case 10, an air blower (not shown), an evaporator 2, a heater core 3, and temperature adjusting doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

Moreover, the evaporator 2 and the heater core 3 are mounted inside the air-conditioning case 10 in an air flow direction in order. The temperature adjusting doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. Cold air and warm air passing through cold air passageway and the warm air passageway are mixed together in a mixing zone, and then, are selectively discharged to the interior of the vehicle through the vents.

The temperature adjusting door is to selectively adjust the air passing the evaporator toward the heater core or in the direction to bypass the heater core. The temperature adjusting door is a single door formed in a flat door type or a dome door type which is rotated on a rotary shaft. FIG. 1 shows an example of two temperature adjusting doors 18 and 19 disposed in the conventional air conditioner. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Furthermore, FIG. 1 illustrates the temperature-adjusting door of the air conditioner in order to describe an operational structure of the door, but the door may be another door. Additionally, hereinafter, the temperature-adjusting door is called a 'door'. The first door 18 is connected to a first shaft 21 and slides by rotation of the first shaft 21, and the second door 19 is connected to a second shaft 22 and slides by rotation of the second shaft 22. The first shaft 21 and the second shaft 22 have gears, and the first door 18 and the second door 19 may have gear grooves engaging with the gears of the first and second shafts 21 and 22.

The two doors are connected to actuators and receive driving power to be operated. However, in this instance, since two actuators are disposed, the conventional air conditioner has a disadvantage in that the number of components is increased and manufacturing costs rise. In the meantime, the two shafts for rotating the two doors may be respectively connected through a rack gear and a pinion gear and the two doors may be operated by just one actuator.

However, the structure for connecting the two doors through the rack gear has several disadvantages in that foreign matters may be introduced into a driving part since the driving part between the rack gear and the shaft is exposed to the outside of the air-conditioning case 10, and in that the introduced foreign matters stuck in the driving part may cause a malfunction and deteriorate durability.

SUMMARY OF THE INVENTION

Accordingly, the present invention has been made to solve the above-mentioned problems occurring in the prior arts, and it is an object of the present invention to provide an air conditioner for a vehicle having a cover of an improved structure which can prevent foreign matters from being introduced into a sliding door driving part and also prevent the introduced foreign matters from being stuck in the driving part.

To accomplish the above object, according to the present invention, there is provided an air conditioner for a vehicle, which includes an air-conditioning case having a heat exchanger, and a first door and a second door disposed in the air-conditioning case to adjust the degree of opening of an air passageway, further including: a plurality of driving parts for interlocking and operating the first door and the second door; and a cover part for fixing the driving part to the air-conditioning case, wherein the cover part covers at least one among the plurality of driving parts.

The air conditioner for a vehicle further includes: a first shaft connected to the first door to move the first door according to rotation; a second shaft connected to the second door to move the second door according to rotation; and a rack gear for connecting the first shaft and the second shaft with each other, wherein the cover part covers at least one among the first shaft and the second shaft.

The air conditioner for a vehicle further includes: a support part protruding on the outer face of the air-conditioning case to support the rack gear.

The support part has a space part formed between the outer face of the air-conditioning case and the rack gear.

The support part includes a first wall member and a second wall member spaced apart from each other in a sliding direction of the rack gear.

The air conditioner for a vehicle further includes: a guide part formed to protrude on the outer face of the air-conditioning case to support the cover part.

The cover part and the guide part get in surface contact with each other.

The cover part has a through hole formed at a portion corresponding to at least one among the first shaft and the second shaft so that a shaft of a power source penetrates through the through hole.

The cover part includes an interference avoiding groove formed at a portion corresponding to the combined part between the air-conditioning case and the power source to prevent interference.

The rack gear includes: a first rack gear part geared with the first shaft to be slidable; a second rack gear part geared with the second shaft to be slidable; and a bridge part for connecting the first rack gear part and the second rack gear part with each other. In this instance, the interference avoiding groove is inclined corresponding to the shape of the bridge part to support the bridge part.

The rack gear includes: a first rack gear part geared with the first shaft to be slidable; a second rack gear part geared with the second shaft to be slidable; and a bridge part for connecting the first rack gear part and the second rack gear part with each other. In this instance, the first wall member and the second wall member are inclined to be aligned with the inclined direction of the bridge part.

The support part includes a third wall member and a fourth wall member formed to be aligned with the sliding direction of the rack gear to respectively support the first rack gear part and the second rack gear part.

The air conditioner for a vehicle further includes: a first shaft connected to the first door to slidably move the first door according to rotation; a second shaft connected to the second door to slidably move the second door according to rotation; and a third shaft for connecting the rack gear and the second shaft with each other to transfer driving power, wherein the cover part covers all of the first shaft, the second shaft, the third shaft, and the rack gear.

The cover part has a first through hole formed to correspond to the first shaft connected with the power source.

The cover part has a second through hole for exposing a part of the second shaft to the outside.

The first door and the second door are spaced apart from each other, and are temp doors to adjust the degree of opening of an air passageway passing through a heat exchanger for heating and an air passageway bypassing the heat exchanger for heating.

The cover part includes: a straight part for accommodating the rack gear and securing a sliding space; a first shaft accommodating part for accommodating the first shaft; a second shaft accommodating part for accommodating the second shaft; and a third shaft accommodating part for accommodating the third shaft.

The second shaft accommodating part and the third shaft accommodating part are extended integrally.

The cover part further includes: a reinforcing part for connecting the first shaft accommodating part and the second shaft accommodating part with each other; and a space part formed between the reinforcing part and the straight part.

The air conditioner for a vehicle according to the present invention can prevent foreign matters from being introduced between the rack gear and the driving part, effectively remove the introduced foreign matters, prevent misassembly of the rack gear, enhance durability of the rack gear by reinforcing strength of the rack gear, and facilitate the rack gear to slide smoothly.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
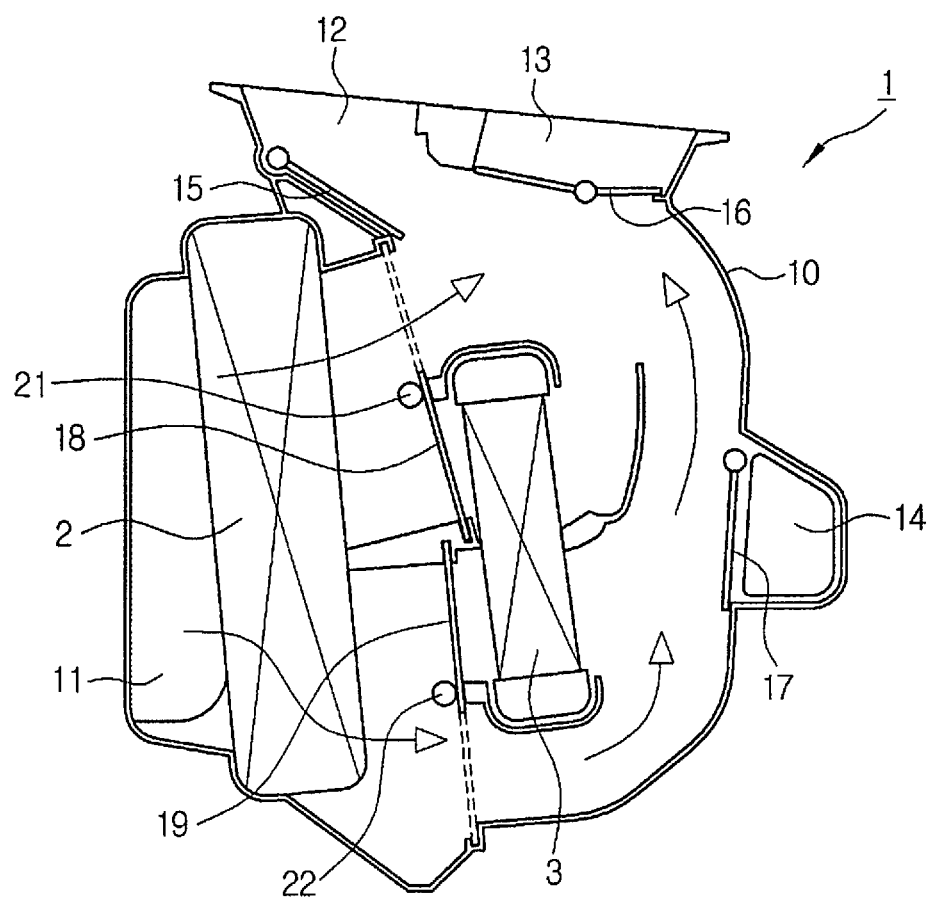
FIG. 1 is a sectional view of a conventional air conditioner for a vehicle.
Figure 2:
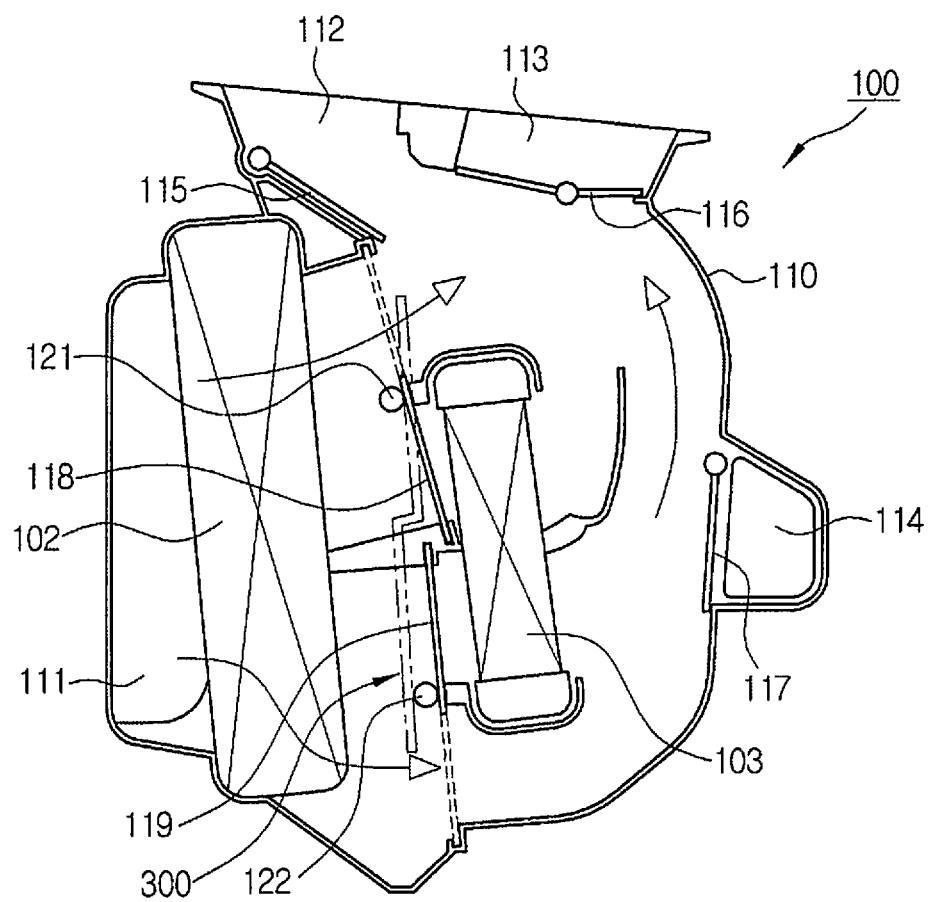
FIG. 2 is a sectional view of an air conditioner for a vehicle according to a first embodiment of the present invention.

FIG. 2 is a sectional view of an air conditioner for a vehicle according to an embodiment of the present invention.

As shown in FIG. 2, the air conditioner 100 for a vehicle according to the embodiment of the present invention includes an air-conditioning case 110, an air blower (not shown), and a first door 118 and a second door 119. A heat exchanger for cooling and a heat exchanger for heating are disposed inside the air-conditioning case 110 in an air flow direction in order.

The heat exchanger for cooling is an evaporator 102 which cools air by exchanging heat between refrigerant of a refrigerant cycle and air, and the heat exchanger for heating is a heater core 103 which heats air by exchanging heat between cooling water of a cooling water line and air. The heat exchanger for heating may be a heat exchanger using condensation heat of a heat pump system, a PTC heater actuated by electricity, or others.

The first door 118 and the second door 119 are disposed inside the air-conditioning case 110 to adjust the degree of opening of an air passageway by sliding. In this embodiment, the first door 118 and the second door 119 are arranged to be spaced apart from each other vertically, and are temperature-adjusting doors. The temperature-adjusting doors adjust the degree of opening of an air passageway passing through the heater core 103, which is the heat exchanger for heating, and an air passageway bypassing the heater core 103.

An air inflow port 111 is formed at an inlet of the air-conditioning case 110, a defrost vent 112, a face vent 113 and a floor vent 114 for adjusting the degree of opening by mode doors 115, 116 and 117 are formed at an outlet of the air-conditioning case 110. The air blower is connected to the air inflow port 111 of the air-conditioning case 110 to blow indoor air or outdoor air. The evaporator 102 and the heater core 103 are mounted inside the air-conditioning case 110 in the air flow direction in order.

The temperature adjusting doors, namely, the first door and the second door, are mounted between the evaporator 102 and the heater core 103 in order to adjust temperature of air discharged to the interior of the vehicle by adjusting the degree of opening of a cold air passageway bypassing the heater core 103 and a warm air passageway passing through the heater core 103. Cold air and warm air passing through cold air passageway and the warm air passageway are mixed together in a mixing zone, and then, are selectively discharged to the interior of the vehicle through the vents.

The air conditioner 100 for a vehicle according to the embodiment of the present invention has two temperature-adjusting doors, namely, the first door 118 and the second door 119. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Moreover, the air conditioner 100 for a vehicle according to the embodiment of the present invention includes a first shaft 121, a second shaft 122, and a rack gear 300. The first shaft 121 is connected to the first door 118 to slidably move the first door 118 according to rotation of the first shaft 121. The second shaft 122 is connected to the second door 119 to slidably move the second door 119 according to rotation of the second shaft 122.

Figure 3:
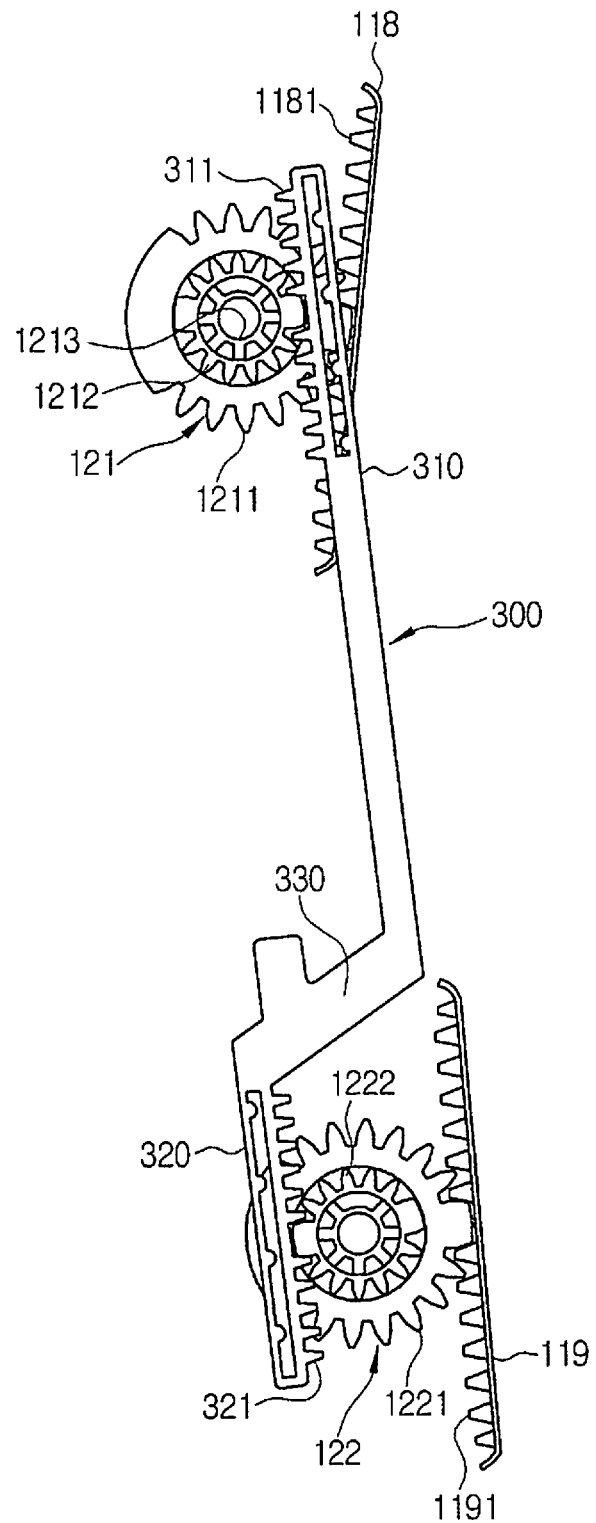
FIG. 3 is a side view showing doors, shafts and a rack gear according to the first embodiment of the present invention.

FIG. 3 is a side view showing the doors, the shafts and the rack gear according to the embodiment of the present invention.

Referring to FIG. 3, the first door 118 is formed in a plate shape having a predetermined thickness. Gear teeth 1181 are formed at both sides of the first door 118 in a width direction of the vehicle. The width direction of the vehicle is an axial direction of the door. The gear teeth 1181 of the first door extends in a sliding direction of the door, and engage with a first gear part 1211 of the first shaft 121. The second door 119 is formed in a plate shape having a predetermined thickness. Gear teeth 1191 extend at both axial sides of the second door 119 in a sliding direction of the door and engage with a first gear part 1221 of the second shaft 122.

The rack gear 300 includes a first rack gear part 310, a second rack gear part 320, and a bridge part 330. The rack gear 300 is slidably mounted on the outer face of the air-conditioning case 110.

The first rack gear part 310 is geared with the first shaft 121 to be slidable, and the second rack gear part 320 is geared with the second shaft 122 to be slidable. The bridge part 330 connects the first rack gear part 310 and the second rack gear part 320 with each other. Extension lines of the first rack gear part 310 and the second rack gear part 320 are aligned in a sliding direction.

The first rack gear part 310 is formed in a bar shape having a predetermined length in the sliding direction. The first rack gear part 310 has gear teeth 311 formed on one side facing the first shaft 121 and geared with the second gear part 1212 of the first shaft.

The second rack gear part 320 is formed in a bar shape having a predetermined length in the sliding direction. The second rack gear part 320 has gear teeth 321 formed on one side facing the second shaft 122 and geared with the second gear part 1222 of the second shaft.

The bridge part 330 is formed to be almost vertical, more exactly, to be inclined, to the sliding direction, and connects the first rack gear part 310 and the second rack gear part 320 with each other. As described above, the rack gear 300 is generally formed in a "Z" shape. The first shaft 121 has a power source combining part 1213 formed at an end portion thereof to be combined with a driving shaft of a power source.

Figure 4:
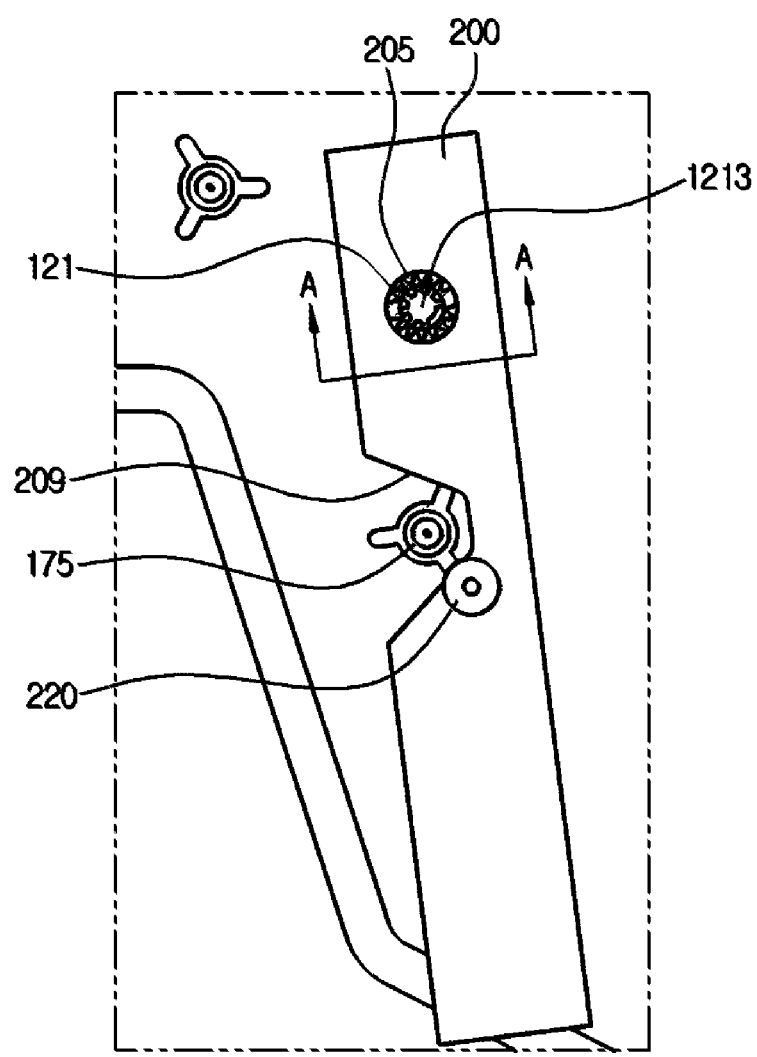
FIG. 4 is a side view showing a cover part of the air conditioner for a vehicle according to the first embodiment of the present invention.
Figure 5:
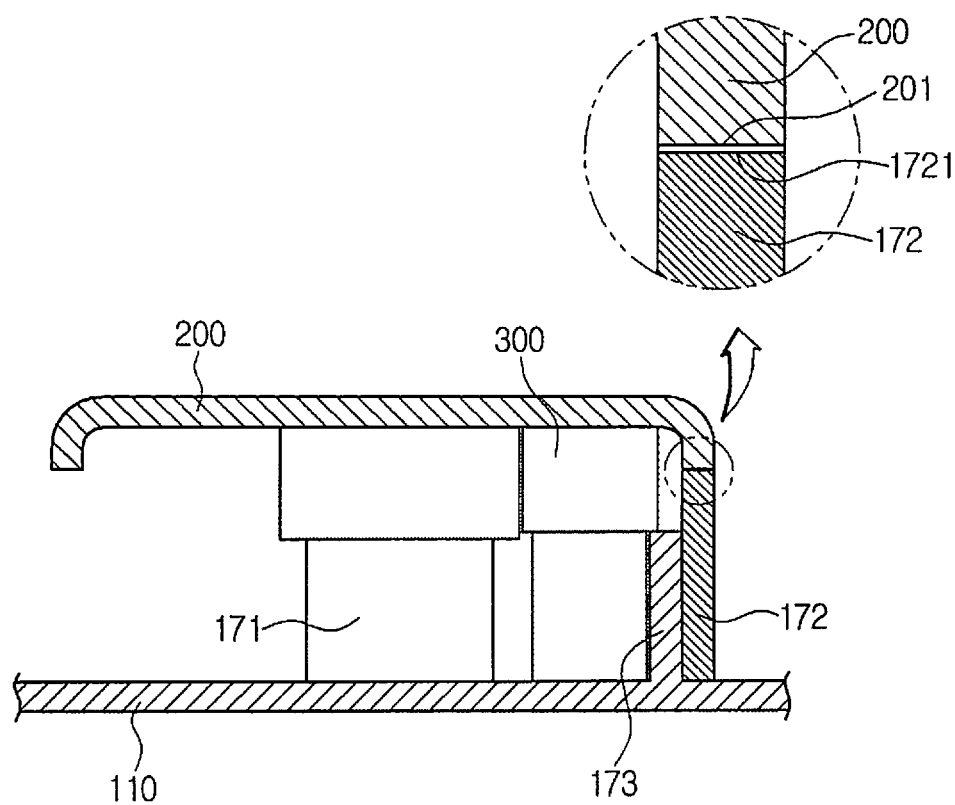
FIG. 5 is a sectional view taken along the line of A-A of FIG. 4.
Figure 6:
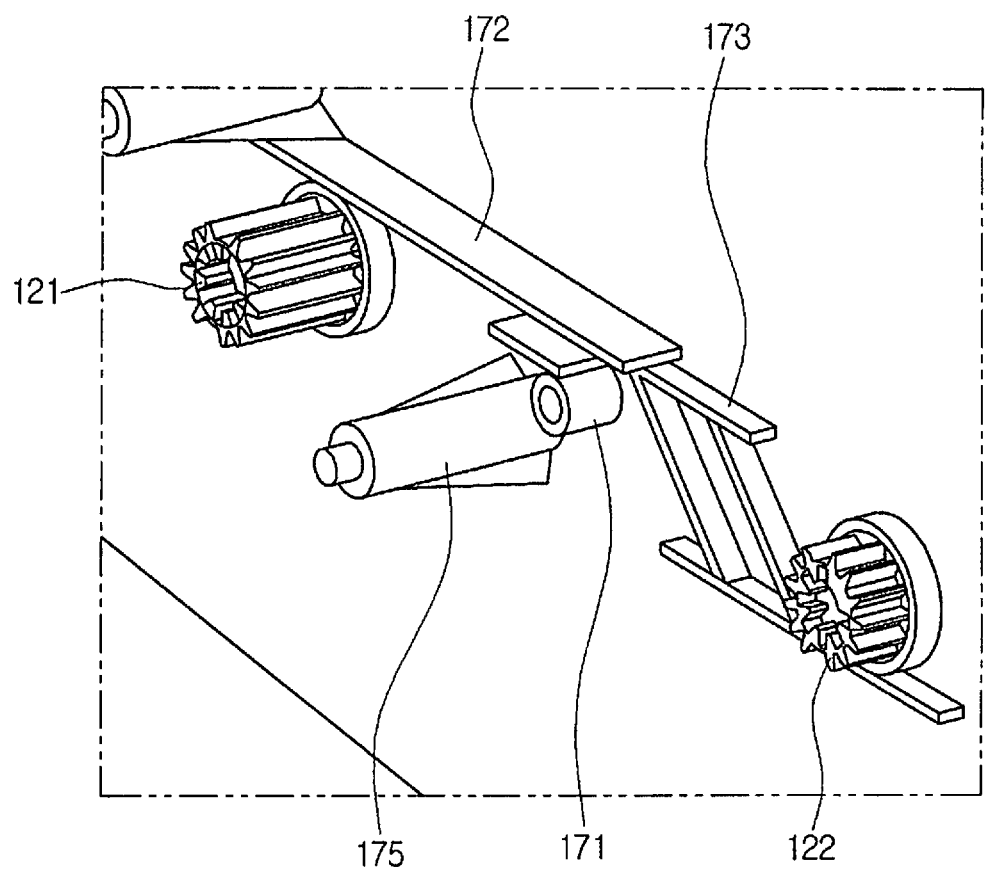
FIG. 6 is a perspective view showing a support part before the rack gear is mounted.
Figure 7:
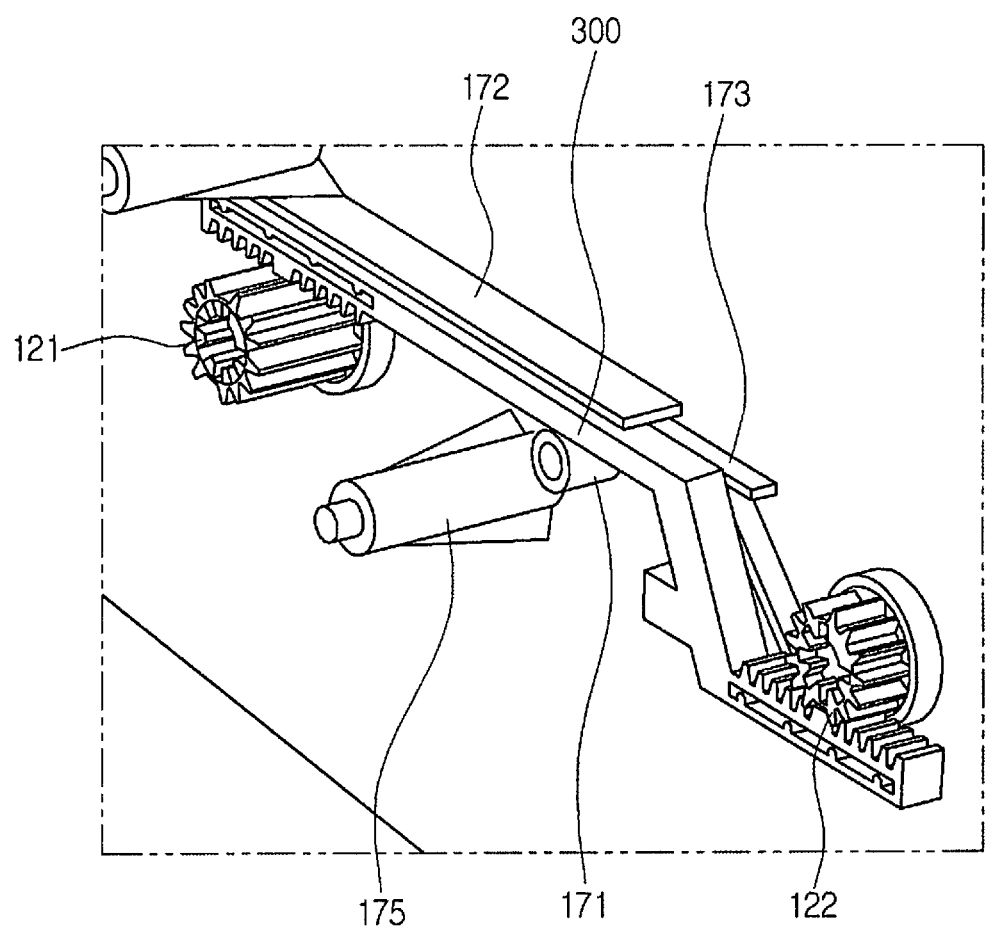
FIG. 7 is a perspective view showing a support part after the rack gear is mounted.
Figure 8:
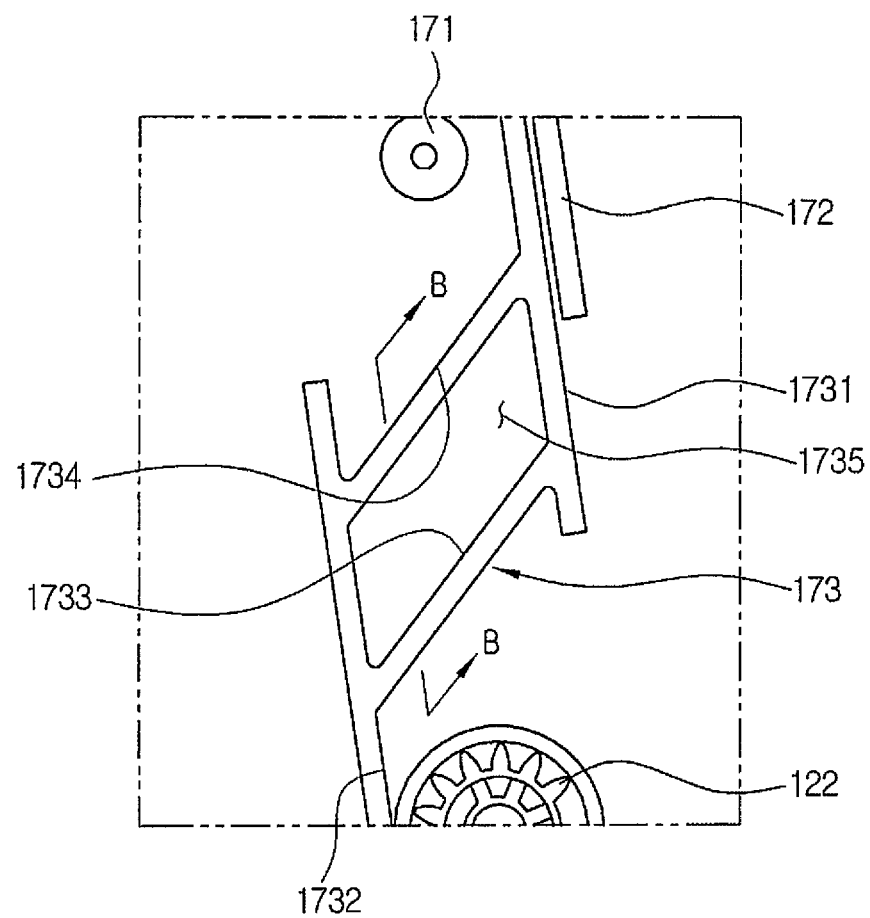
FIG. 8 is a side view showing the support part according to the first embodiment of the present invention.
Figure 9:
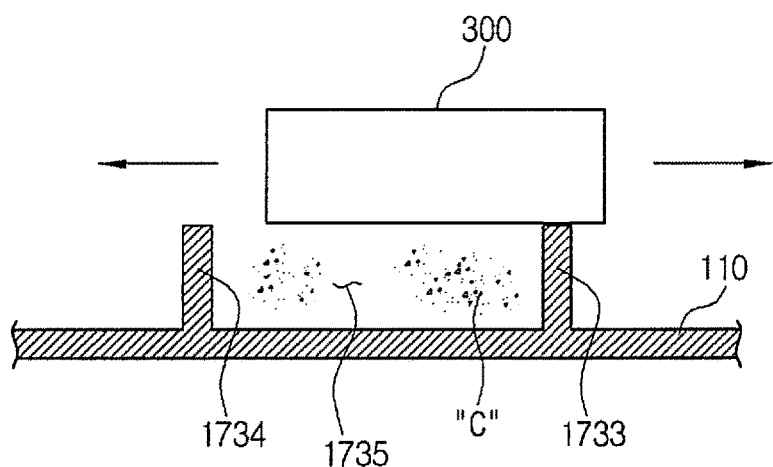
FIG. 9 is a sectional view taken along the line of B-B of FIG. 8.

FIG. 4 is a side view showing a cover part of the air conditioner for a vehicle according to the first embodiment of the present invention, FIG. 5 is a sectional view taken along the line of A-A of FIG. 4, FIG. 6 is a perspective view showing a support part before the rack gear is mounted, FIG. 7 is a perspective view showing a support part after the rack gear is mounted, FIG. 8 is a side view showing the support part according to the first embodiment of the present invention, and FIG. 9 is a sectional view taken along the line of B-B of FIG. 8.

The air conditioner for a vehicle according to the present invention includes a cover part 200. The cover part 200 is to fix the rack gear 300 to the air-conditioning case 110, and is formed to cover at least one among the plurality of shafts.

That is, the cover part 200 may cover only one among the first shaft 121 and the second shaft 122 or may cover all of the two shafts. The cover part 200 functions to fix the rack gear 300, and provides additional effect to prevent foreign matters from being introduced into geared parts since having a part to cover the shaft.

Figure 10:
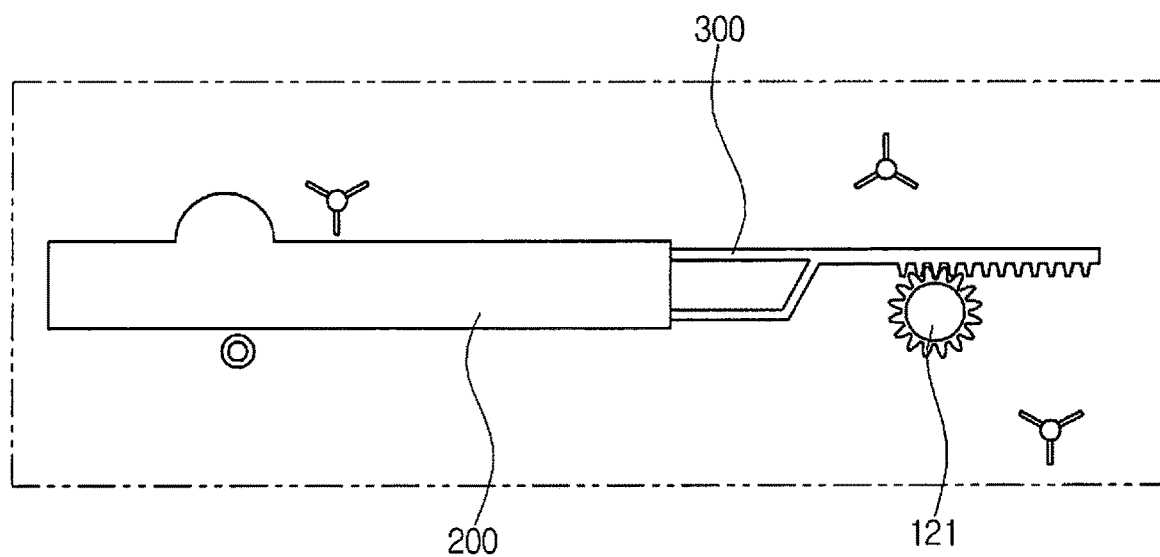
FIG. 10 is a side view showing a cover part according to a modification of FIG. 4.

Referring to FIG. 4, the cover part 200 is combined with the air-conditioning case 110 and covers all of the rack gear 300, the first shaft 121, and the second shaft 122. FIG. 10 is a side view showing a cover part according to a modification of FIG. 4. Referring to FIG. 10, the cover part 200 may be formed to cover only the second shaft and not to cover the first shaft 121. In this instance, the first shaft 121 does not need the cover part since the first shaft 121 must be combined with an actuator.

The cover part 200 has a cross section of a "⊓" shape and forms a predetermined space to receive the rack gear 300, the first shaft 121 and the second shaft 122 between the cover part 200 and the outer face of the air-conditioning case 110. Referring to the front view of FIG. 4, the cover part 200 has an approximately rectangular shape formed long in the sliding direction of the rack gear 300. Four sides of the cover part 200 are bent to have a cross section of a "⊓" shape in order to prevent foreign matters from being introduced between the rack gear 300 and the driving part inside the cover part.

The air-conditioning case 110 has an assembly boss 171 protruding on the outer face to be assembled with the cover part 200, and the cover part 200 has a combining part 220 formed on one side facing the air-conditioning case 110 to correspond to the assembly boss 172. The cover part 200 may be combined with the air-conditioning case 110 using a coupling means, such as a screw.

The air-conditioning case 110 further includes a guide part 172 and a support part 173 disposed on the outer face thereof.

The guide part 172 protrudes on the outer face of the air-conditioning case 110 to support the cover part 200. The cover part 200 and the guide part 172 get in surface contact with each other. That is, a section 201 of the cover part 200 facing the guide part 172 and a section 1721 of the guide part 172 facing the cover part 200 get in surface contact with each other. Therefore, the guide part 172 can effectively prevent introduction of foreign matters by reducing a gap between the air-conditioning case 110 and the cover part 200.

The guide parts 172 may be formed on the outer face of the first rack gear part 310 and the outer face of the second rack gear part 320 in the width direction to support both sides of the rack gear 300 in the width direction. The guide part 172 may extend long in the longitudinal direction of the first rack gear part 310 and the second rack gear part 320.

The support part 173 protrudes on the outer face of the air-conditioning case 110 to support the rack gear 300. The support part 173 maintains a height of the rack gear 300, namely, a distance from the outer face of the air-conditioning case 110 to support sliding of the rack gear 300 on the outer face of the air-conditioning case 110.

The support part 173 forms a space part 1735 between the outer face of the air-conditioning case 110 and the rack gear 300. The space part 1735 makes a central portion of the support part 173 hollow to reduce weight of the air conditioner and reduce manufacturing costs of the air conditioner. Moreover, the space part 1735 reduces friction force by reducing a contact surface between the support part 173 and the rack gear 300 when the rack gear 300 slides.

Moreover, the space part 1735 pushes foreign matters (C) to the space part 1735 when foreign matters (C) are introduced between the rack gear 300 and the support part 173 so that the foreign matters are accommodated in the space part 1735. Therefore, the space part 1735 can prevent foreign matters from being stuck between the rack gear and the driving part by removing the foreign matters that the cover part 200 did not prevent or minimize the foreign matters stuck between the rack gear and the driving part.

In more detail, the support part 173 includes a first wall member 1733, a second wall member 1734, a third wall member 1731, and a fourth wall member 1732.

The first wall member 1733 and the second wall member 1734 are spaced apart from each other in the sliding direction of the rack gear 300. The third wall member 1731 and the fourth wall member 1732 are formed to be aligned with the sliding direction of the rack gear 300. The third wall member 1731 is formed at a position corresponding to the first rack gear part 310 to support the first rack gear part 310, and the fourth wall member 1732 is formed at a position corresponding to the second rack gear part to support the second rack gear part 320.

The first wall member 1733 and the second wall member 1734 connect the third wall member 1731 and the fourth wall member 1732 with each other. As shown in FIG. 8, the first wall member 1733, the second wall member 1734, the third wall member 1731 and the fourth wall member 1732 form one sealed space part 1735 to accommodate the foreign matters.

The first wall member 1733 and the second wall member 1734 are inclined to be aligned with the inclined direction of the bridge part 330. When the rack gear 300 slides, the bridge part 330 reciprocates between the first wall member 1733 and the second wall member 1734. In this instance, the first wall member 1733 and the second wall member 1734 serve as hair of a broom to sweep the foreign matters between the rack gear 300 and the support part 172.

The cover part 200 has a through hole 205. The through hole 205 is formed at a portion corresponding to at least one among the first shaft 121 and the second shaft 122. In this embodiment, the through hole 205 is formed at a portion corresponding to the first shaft 121. In this instance, it is possible that the through hole 205 is formed to correspond to the first shaft 121 and the second shaft 122. The through hole 205 penetrates through the driving shaft of the power source, so that the driving shaft of the power source is combined with the power source combining part 1213 of the first shaft 121. The power source may be an actuator. The second shaft which is not combined with the power source is covered with the cover part 200 so as to prevent inflow of foreign matters.

Furthermore, the cover part 200 has an interference avoiding groove 209. The interference avoiding groove 209 is formed in a portion corresponding to the assembly boss 175 formed in the air-conditioning case 110 to prevent interference that may occur when the air-conditioning case 110 and the cover unit 200 are combined. That is, the interference avoiding groove 209 is dented inwardly from the cover part 200 to accommodate the assembly boss 175.

The interference avoiding groove 209 is inclined to correspond to the shape of the bridge part 330 to support the bridge part 330. Therefore, the interference avoiding groove 209 can enhance durability of the rack gear 300 by reinforcing rigidity of the bridge part 330. Additionally, when the cover part 200 is assembled to the air-conditioning case 110, a misassembled state of the rack gear 300 can be checked by the cover part 200 corresponding to the shape of the rack gear 300. If the rack gear 300 is misassembled to the air-conditioning case 110, it is impossible to assemble the cover part 200 to the air-conditioning case 110 or the cover part 200 is misassembled to the air-conditioning case 110, so a worker can check it with naked eyes.

Figure 11:
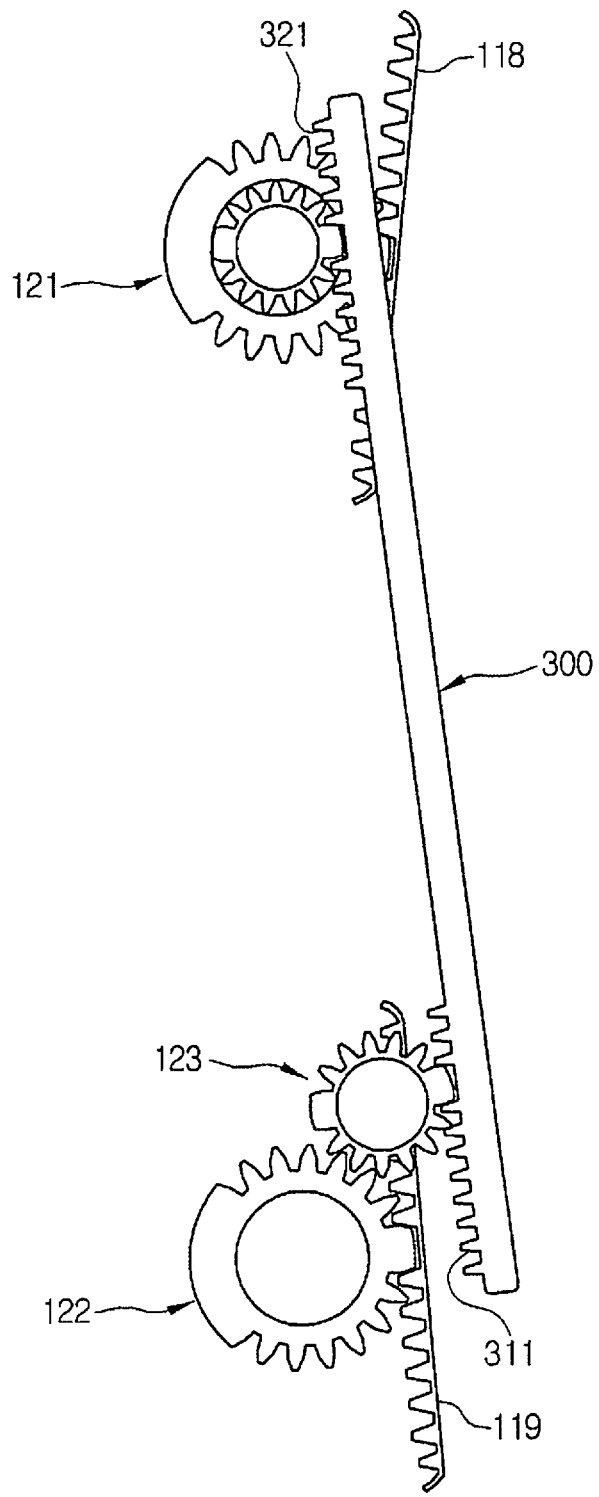
FIG. 11 is a side view showing doors, shafts and a rack gear according to a second embodiment of the present invention.
Figure 12:
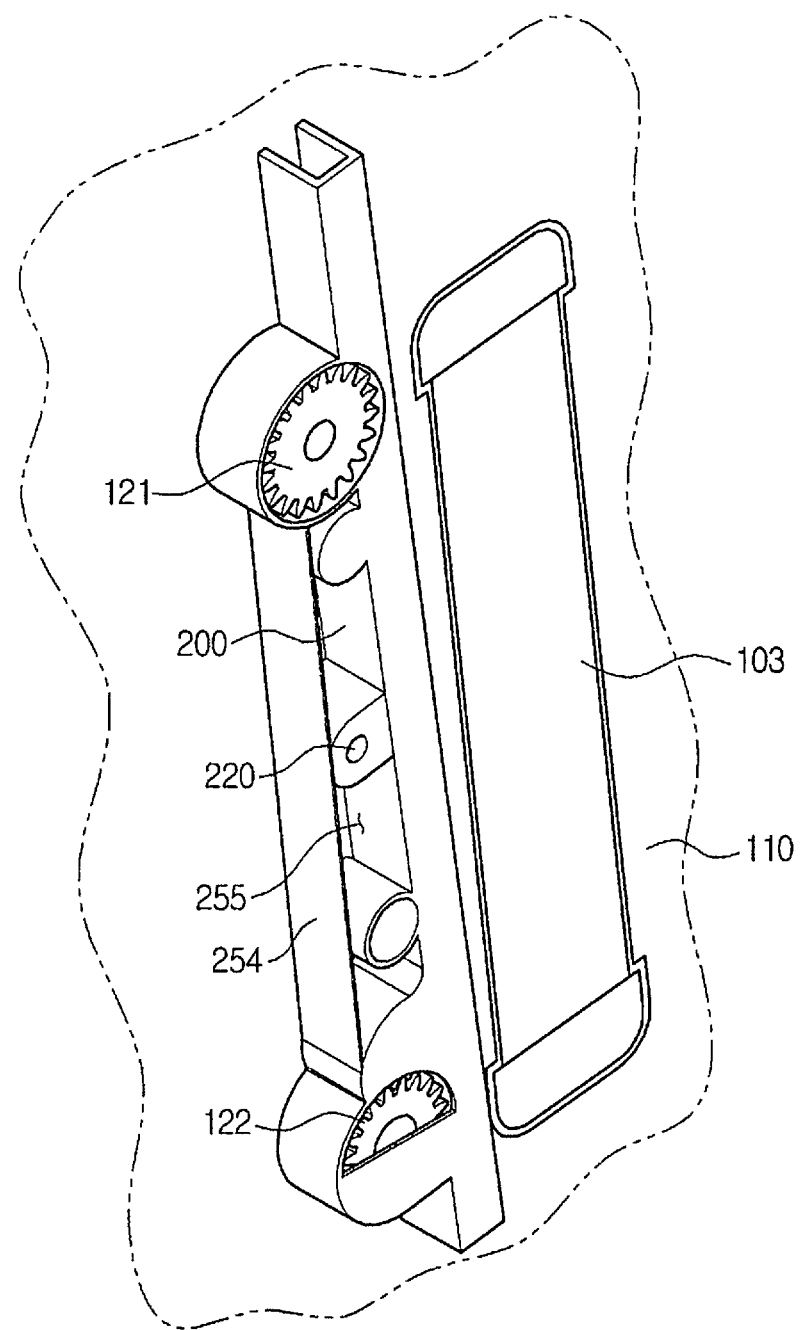
FIG. 12 is a perspective view showing a part of an air-conditioning case on which a cover part is mounted according to the second embodiment of the present invention.
Figure 13:
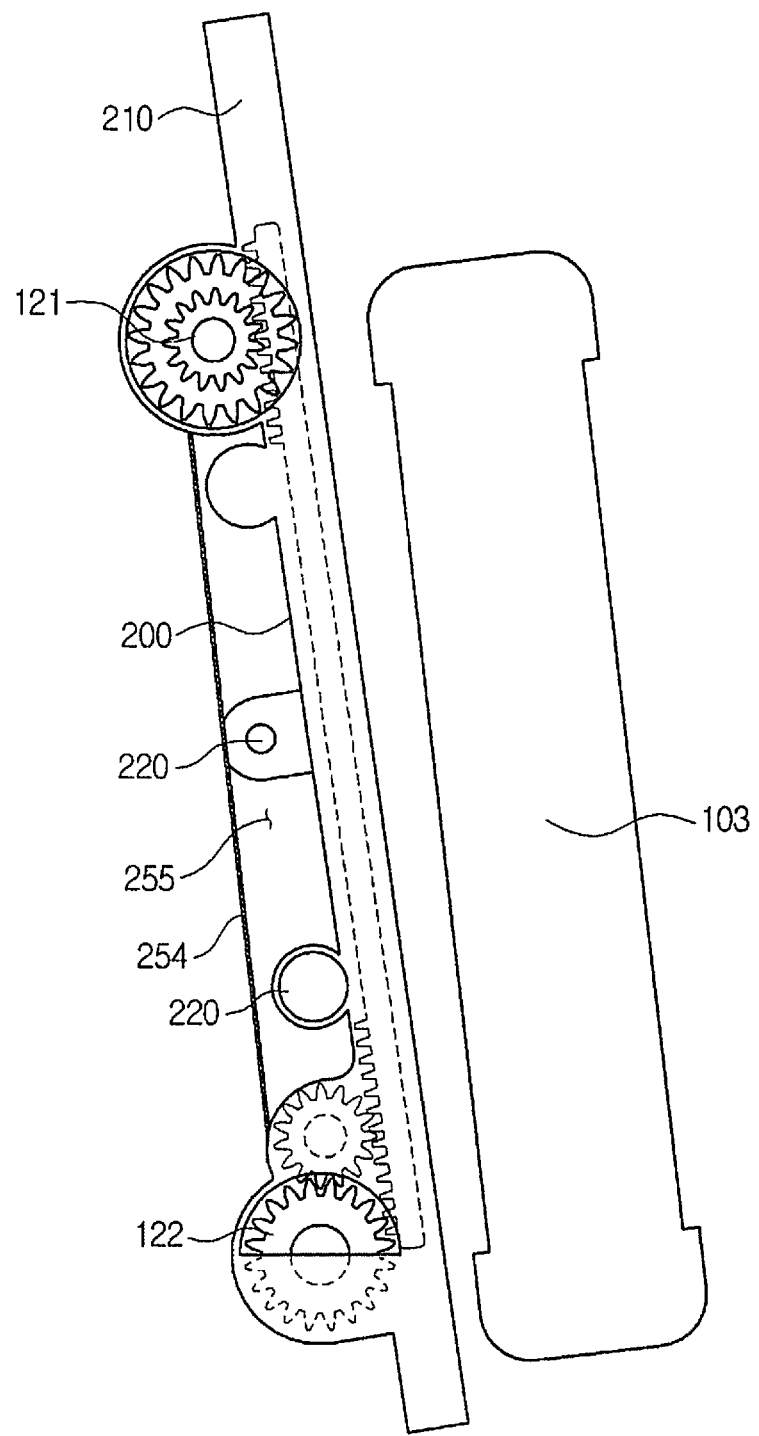
FIG. 13 is a side view of FIG. 12.
Figure 14:
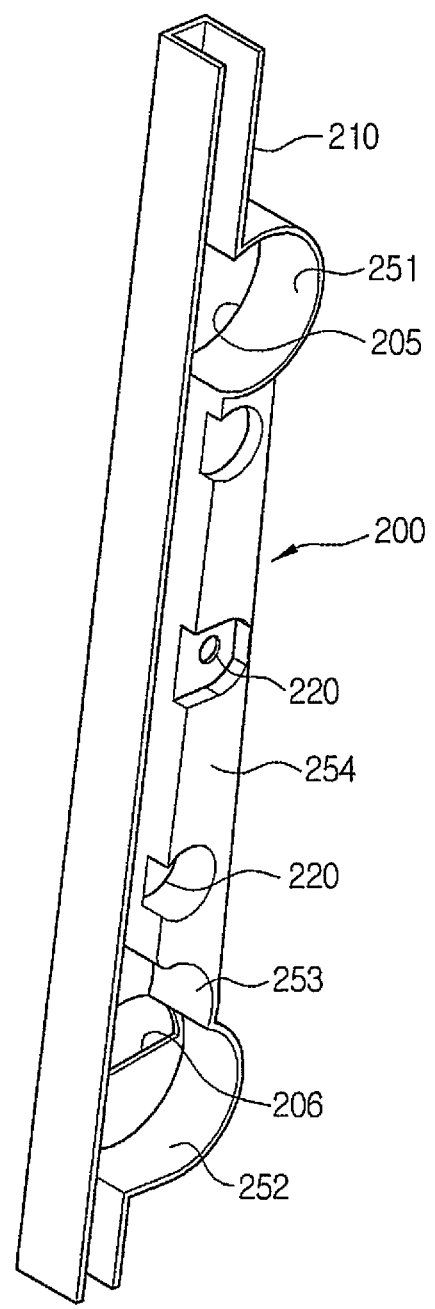
FIG. 14 is a perspective view of the rear side of the cover part according to the second embodiment of the present invention.
Figure 15:
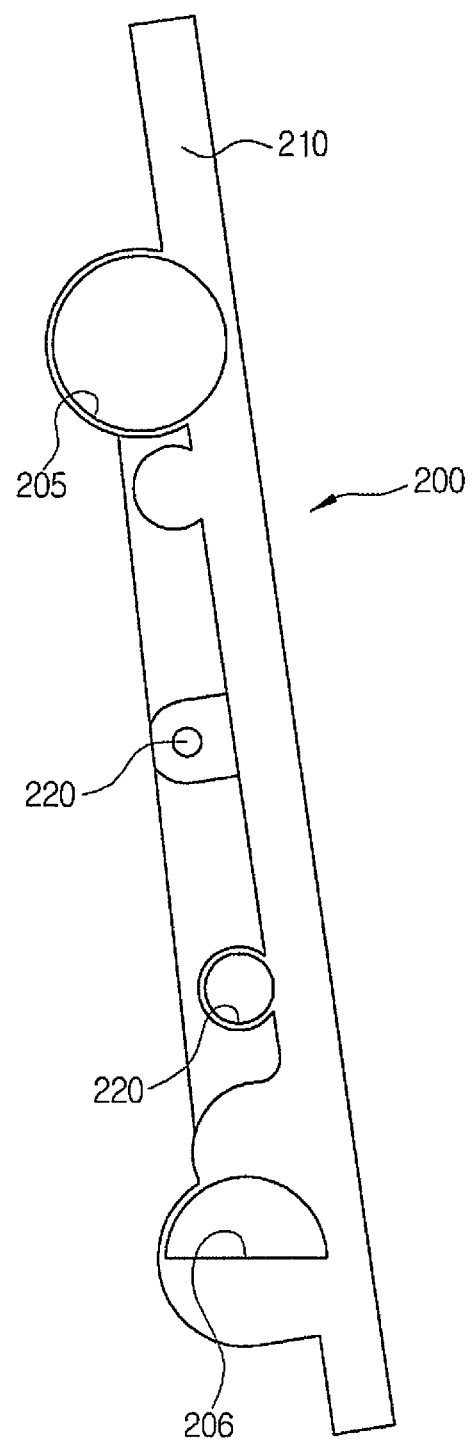
FIG. 15 is a side view of the cover part according to the second embodiment of the present invention.

FIG. 11 is a side view showing doors, shafts and a rack gear according to a second embodiment of the present invention, FIG. 12 is a perspective view showing a part of an air-conditioning case on which a cover part is mounted according to the second embodiment of the present invention, FIG. 13 is a side view of FIG. 12, FIG. 14 is a perspective view of the rear side of the cover part according to the second embodiment of the present invention, and FIG. 15 is a side view of the cover part according to the second embodiment of the present invention.

Referring to FIGS. 11 to 15, the air conditioner for a vehicle according to the second embodiment of the present invention includes a first shaft 121, a rack gear 300, a second shaft 122, a third shaft 123, and a cover part 200.

The first shaft 121 is connected to the first door 118 to slidably move the first door 118 according to rotation. The second shaft 122 is connected to the second door 119 to slidably move the second door 119 according to rotation. The rack gear 300 is connected to the first shaft 121. The third shaft 123 connects the rack gear 300 and the second shaft 122 with each other to transfer driving power. The first door 118 and the second door 119 are arranged to be vertically spaced apart from each other, and are temp doors to adjust the degree of opening of an air passageway passing the heater core 103 and an air passageway bypassing the heater core 103.

The first door 118 is formed in a plate shape having a predetermined thickness. Gear teeth are formed at both sides of the first door 118 in a width direction. The width direction of the vehicle is an axial direction of the door. The second door 119 is formed in a plate shape having a predetermined thickness. Gear teeth extend at both axial sides of the second door 119 in a sliding direction of the door and engage with a gear part of the second shaft 122.

The first door 118 and the second door 119 are operated by the first shaft 121 and the second shaft 122, and the rack gear 300 and the third shaft 123 serve to transfer driving power of the power source connected to the first shaft 121 to the second shaft 122. The power source may be an actuator, and is connected only to the first shaft 121 and is not directly connected to the second shaft 122 and the third shaft 123. The first door 118 slides by rotation of the first shaft 121, and the rack gear 300 moves vertically to rotate the third shaft 123. The second shaft 122 is rotated by rotation of the third shaft 123, so the second door 119 slides.

The rack gear 300 is formed in a straight line, and has gear teeth 321 formed at one side to be geared with the gear part, namely, the second gear part 1212, of the first shaft, and gear teeth 311 formed at the other side to be geared with the gear part of the third shaft 123. Moreover, the first shaft 121, the second shaft 122, and the third shaft 123 are all arranged at one side with respect to the rack gear 300. That is, the first shaft 121, the second shaft 122, and the third shaft 123 are arranged at the front in the back-and-forth direction of the vehicle with respect to the rack gear 300.

The cover part 20 is to fix the rack gear 300 to the air-conditioning case 110, and covers all of the first shaft 121, the second shaft 122, the third shaft 123 and the rack gear 300. The cover part 200 functions to fix the rack gear 300, and provides additional effect to prevent foreign matters from being introduced into geared parts since having a part to cover the shaft.

The cover part 200 includes a first through hole 205 and a second through hole 206. The first through hole 205 is formed at a portion corresponding to the first shaft 121 connected with the power source. The second through hole 206 is formed at a portion corresponding to the second shaft 122 and exposes a part of the second shaft 122 to the outside. The second through hole 206 is formed in a semicircular shape. The second through hole 206 partially exposes the second shaft 122 and partially covers the second shaft 122 to prevent inflow of foreign matters and allows the worker to check the assembled state with naked eyes.

The cover part 200 includes a straight part 210, a first shaft accommodating part 251, a second shaft accommodating part 252, and a third shaft accommodating part 253. The straight part 210 accommodates the rack gear 300 and secures a sliding space. The straight part 210 vertically extends in a straight line to secure a space for allowing the rack gear 300 to slide.

The first shaft accommodating part 251 accommodates the first shaft 121 and has a space part extended in a circle from the straight part 210. The second shaft accommodating part 252 accommodates the second shaft 122 and has a space part extended in a circle from the straight part 210. The third shaft accommodating part 253 accommodates the third shaft 123 and has a space part extended in a circle from the straight part 210. The second shaft accommodating part 252 and the third shaft accommodating part 253 are formed integrally.

Furthermore, the cover part 200 includes a reinforcing part 254 and a space part 255. The reinforcing part 254 connects the first shaft accommodating part 251 and the second shaft accommodating part 252 with each other to reinforce strength of the cover part 200. The space part 255 is formed between the reinforcing part 254 and the straight part 210 to reduce weight of the cover part 200, thereby reducing manufacturing costs. A plurality of combining parts 220 to be combined with the air-conditioning case 110 are formed on the cover part 200.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which includes an air-conditioning case having a heat exchanger, and a first door and a second door disposed in the air-conditioning case to adjust a degree of opening of an air passageway, the air conditioner comprising:
    a plurality of driving parts for interlocking and operating the first door and the second door;
    a cover part for fixing the plurality of driving parts to the air-conditioning case, wherein the cover part covers at least one among the plurality of driving parts;
    a first shaft connected to the first door to move the first door according to rotation;
    a second shaft connected to the second door to move the second door according to rotation;
    a rack gear for connecting the first shaft and the second shaft with each other, wherein the cover part covers at least one among the first shaft and the second shaft, and
    a support part protruding on an outer face of the air-conditioning case to support the rack gear,
    wherein the support part has a space part formed between the outer face of the air-conditioning case and the rack gear in order to reduce a contact surface between the support part and the rack gear when the rack gear slides.

2. The air conditioner according to claim 1, wherein the support part includes a first wall member and a second wall member spaced apart from each other in a sliding direction of the rack gear.

3. The air conditioner according to claim 2, wherein the rack gear includes: a first rack gear part geared with the first shaft to be slidable; a second rack gear part geared with the second shaft to be slidable; and a bridge part for connecting the first rack gear part and the second rack gear part with each other, and
    wherein the first wall member and the second wall member are inclined to be aligned with the inclined direction of the bridge part.

4. The air conditioner according to claim 3, wherein the support part includes a third wall member and a fourth wall member formed to be aligned with the sliding direction of the rack gear to respectively support the first rack gear part and the second rack gear part.

5. The air conditioner according to claim 1, wherein the cover part and the guide part get in surface contact with each other.

6. The air conditioner according to claim 1, wherein the cover part has a through hole formed at a portion corresponding to at least one among the first shaft and the second shaft so that a shaft of a power source penetrates through the through hole.

7. The air conditioner according to claim 1, wherein the cover part includes an interference avoiding groove formed in a portion corresponding to the assembly boss formed in the air-conditioning case to prevent interference that may occur when the air-conditioning case and the cover unit are combined.

8. The air conditioner according to claim 7, wherein the rack gear includes: a first rack gear part geared with the first shaft to be slidable; a second rack gear part geared with the second shaft to be slidable; and a bridge part for connecting the first rack gear part and the second rack gear part with each other, and wherein the interference avoiding groove is inclined corresponding to the shape of the bridge part to support the bridge.

9. The air conditioner according to claim 1, wherein the first door and the second door are spaced apart from each other, and are temp doors to adjust the degree of opening of an air passageway passing through a heat exchanger for heating and an air passageway bypassing the heat exchanger for heating.

10. The air conditioner according to claim 1, further comprising:

a guide part formed to protrude on the outer face of the air-conditioning case to support the cover part.

11. An air conditioner for a vehicle, which includes an air-conditioning case having a heat exchanger, and a first door and a second door disposed in the air-conditioning case to adjust the degree of opening of an air passageway, the air conditioner comprising:

a plurality of driving parts for interlocking and operating the first door and the second door; and a cover part for fixing the plurality of the driving parts to the air-conditioning case, wherein the cover part covers at least one among the plurality of the driving parts;

a first shaft connected to the first door to slidably move the first door according to rotation;

a rack gear connected to the first shaft;

a second shaft connected to the second door to slidably move the second door according to rotation; and a third shaft for connecting the rack gear and the second shaft with each other to transfer driving power, wherein the cover part covers all of the first shaft, the second shaft, the third shaft, and the rack gear.

12. The air conditioner according to claim 11, wherein the cover part has a first through hole formed to correspond to the first shaft connected with the power source.

13. The air conditioner according to claim 11, wherein the cover part has a second through hole for exposing a part of the second shaft to an outside of the cover part.

14. The air conditioner according to claim 11, wherein the cover part includes:

a straight part for accommodating the rack gear and securing a sliding space;

a first shaft accommodating part for accommodating the first shaft;

a second shaft accommodating part for accommodating the second shaft; and a third shaft accommodating part for accommodating the third shaft.

15. The air conditioner according to claim 14, wherein the second shaft accommodating part and the third shaft accommodating part are extended integrally.

16. The air conditioner according to claim 14, wherein the cover part further includes:

a reinforcing part for connecting the first shaft accommodating part and the second shaft accommodating part with each other; and a space part formed between the reinforcing part and the straight part.

17. An air conditioner for a vehicle, which includes an air-conditioning case having a heat exchanger, and a first door and a second door disposed in the air-conditioning case to adjust a degree of opening of an air passageway, the air conditioner comprising:

a plurality of driving parts for interlocking and operating the first door and the second door; a cover part for fixing the plurality of the driving parts to the air-conditioning case, wherein the cover part covers at least one among the plurality of the driving parts;

a first shaft connected to the first door to move the first door according to rotation;

a second shaft connected to the second door to move the second door according to rotation;

a rack gear for connecting the first shaft and the second shaft with each other, wherein the cover part covers at least one among the first shaft and the second shaft, a support part protruding on an outer face of the air-conditioning case to support the rack gear, wherein the support part has a space part formed between the outer face of the air-conditioning case and the rack gear; and wherein the support part includes a first wall member and a second wall member spaced apart from each other in a sliding direction of the rack gear to support the rack gear.

* * * * *